United States Patent [19]

Gabas

[11] Patent Number: 5,061,003
[45] Date of Patent: Oct. 29, 1991

[54] COVER FOR AUTOMOBILE SUN VISOR MIRRORS

[75] Inventor: Carlos Gabas, Barcelona, Spain

[73] Assignee: Industrias Techno-Matic S.A., Espronceda, Spain

[21] Appl. No.: 566,408
[22] PCT Filed: Dec. 19, 1989
[86] PCT No.: PCT/ES89/00004
§ 371 Date: Aug. 17, 1991
§ 102(e) Date: Aug. 17, 1991
[87] PCT Pub. No.: WO90/07436
PCT Pub. Date: Jul. 12, 1990

[30] Foreign Application Priority Data

Dec. 26, 1988 [ES] Spain .................... P8803959

[51] Int. Cl.$^5$ .......................... B60J 3/00
[52] U.S. Cl. .................... 296/97.1; 296/97.5
[58] Field of Search ............ 296/97.1, 97.2, 97.5, 296/97.6, 97.8; 350/604, 606; 362/83.1

[56] References Cited

U.S. PATENT DOCUMENTS

| | | | |
|---|---|---|---|
| 4,564,234 | 1/1986 | Kaiser et al. | 296/97.5 |
| 4,648,011 | 3/1987 | Boote et al. | 296/97.5 X |
| 4,809,140 | 2/1989 | Jönsas | 296/97.5 X |
| 4,948,240 | 8/1990 | Zipperle | 296/97.1 X |
| 4,961,608 | 10/1990 | Nash | 296/97.5 |

FOREIGN PATENT DOCUMENTS 2429685 2/1980 France ................ 296/97.5

Primary Examiner—Margaret A. Focarino
Assistant Examiner—Joseph D. Pape
Attorney, Agent, or Firm—Michael J. Striker

[57] ABSTRACT

The cover for automobile sun visor mirrors has several rigid sheet-like plates, overlapping and connected slidably to each other with a plurality of lug and slot sets in a continuous chain-like succession, such that in the open position exposing the mirror all the plates are accumulated one above the other and retracted in the interior of a container concealed in the sun visor body. To close the cover, the foremost plate is pulled outwards, which carries along with it the other plates until the whole of the mirror is covered. The movement may be lengthwise or transverse relative to the major axis of the sun visor. The sun visor and the mirror may have any appropriate structure and may be equipped with other auxiliarly or complementary items such as a document holder bag and lights, respectively.

7 Claims, 3 Drawing Sheets

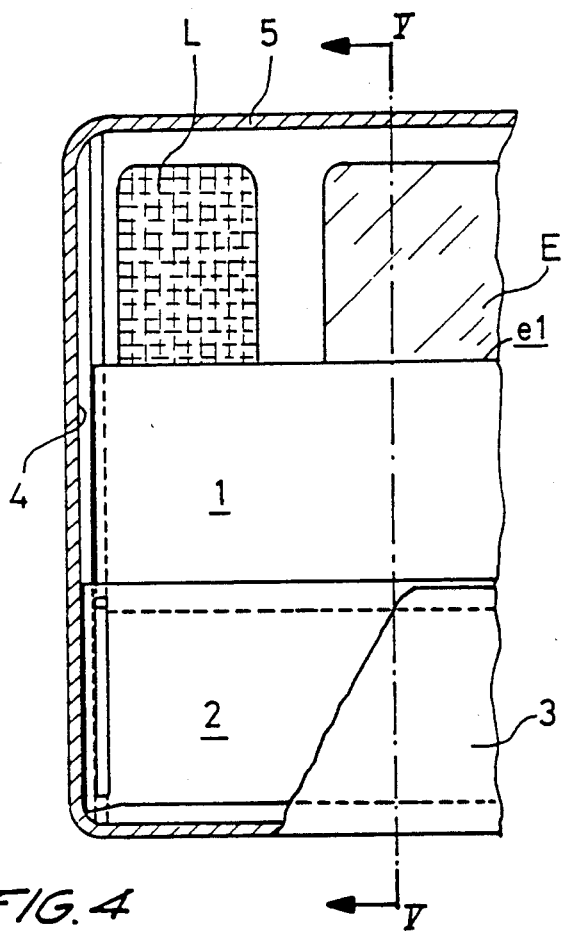
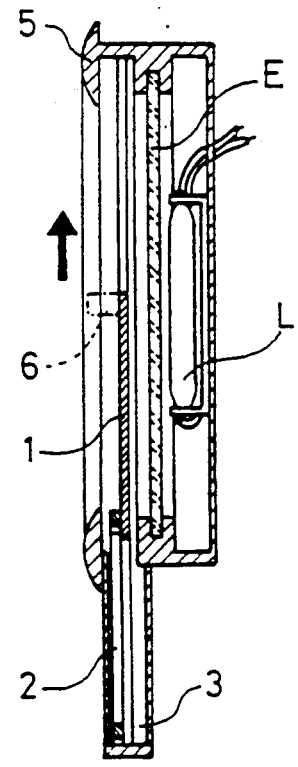
FIG.4    FIG.5
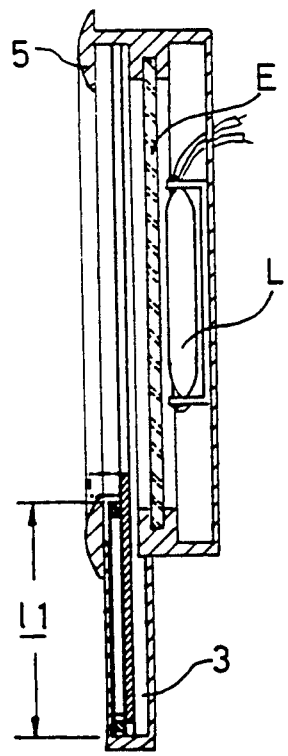
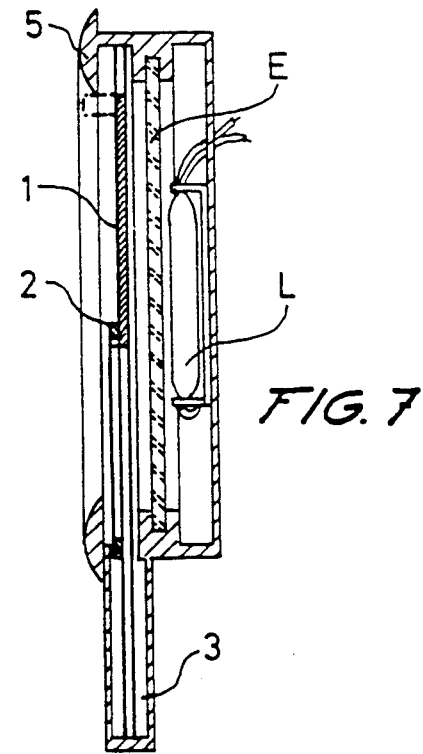
FIG.6    FIG.7

COVER FOR AUTOMOBILE SUN VISOR MIRRORS

FIELD OF THE INVENTION

The invention relates to a cover for automobile sun visor mirrors. Consequently, this invention lies within the generic field of automobile accessories.

BACKGROUND OF THE INVENTION

There are many automobile sun visor structures having a mirror incorporated in their structure, at times known as "vanity mirrors", which are for the personal use of the passenger seated in the free front seat and even for the driver when his sun visor is equipped with such a mirror.

It is also known that such mirrors, in view of their location within the area of air flow inside the vehicle, tend to collect dust with ease and become dirty in relatively short periods of time. Such is the situation that, if they are not frequently cleaned, they become practically unusable. And to solve this drawback many known structures are provided with covers. The Spanish utility models Nos. 276352, 276353 and 276822 may be cited in this respect. In the first two references cited, there are described covers having a very simple structure, which have the drawback that when the mirror is uncovered, they hang freely and produce practical problems, which are accentuated above all when the vehicle is in movement, and also aesthetic problems.

The above Spanish utility model No. 276822 describes a cover which, when retracted, becomes concealed within the sun visor structure, thereby eliminating the drawbacks first mentioned above. Nevertheless, this embodiment suffers from the difficulty of requiring a very long cavity capable of receiving practically the whole length of the cover when this is withdrawn to reveal the mirror, within the internal structure of the sun visor body. The relatively large dimensions of the cavity cause problems for an adequate location of the sun visor components such as: its internal framework; the hinge body; the electrical illumination means where the sun visor is provided with independent light sources. These drawbacks are overcome in part in European patent No. EP 0099454, which describes a cover for a sun visor mirror made from flexible material which is capable of being concealed within the sun visor body when the mirror is uncovered, in three different ways: a) folding back in a large loop requiring an internal housing situated as an extension of the mirror and having a length equal to half the total length of the cover body; b) by being rolled up around a spool located at a side of the mirror; and, c) by sliding linearly, i.e. without being wound up or forming loops, towards a housing which is situated behind the mirror body. It should be noted that in all three cases a), b) and c) described, it is absolutely necessary for the cover to be made from flexible material, such as a thick fabric or a flexible plastic band or tape. This constitution may cause jamming because of uncontrolled friction or the formation of small folds. Also the edges contacting the guides are subject to wear which doubtlessly is more intense with the common flexible materials. To combat this harmful phenomenon, it would be necessary to use expensive specially resistant materials. A further negative factor of the embodiments described in European patent EP 0099454 lies in the relative mechanical complexity of the means designed to house the flexible cover, which also affects the production costs, making them relatively high.

SUMMARY OF THE INVENTION

The sun visor mirror cover according to the invention has been devised to allow it to be retracted within a housing formed in the structure of the sun visor itself, allowing the use of common rigid materials, such as rigid plastics which last longer and are cheaper than flexible materials.

A further advantage derived from the new structure of the cover according to the invention, is its highly reliable operation and the very low risk of breakdown from wear of the materials. Since common rigid low price plastics may be used, the friction resistance of which is adequate for it to remain in good condition throughout the whole working life of the mirror which is normally long in this type of accessory.

According to the invention, the cover for automobile sun visor mirrors is characterized in that it comprises a plurality of rigid sheet-like plates, preferably two or three, having an essentially rectangular shape, overlapping and connected together one after the other, with the aid of appropriate means, in continuous chain-like series maintaining a degree of freedom of movement by relative sliding one over the other in the direction of the opening and closing movements of the cover. The plates are situated under the mirror frame and over the mirror, with a smooth fit between the side walls of the frame which is provided with guideways for the sliding movements. The side walls extend inside the structure of the sun visor body forming an internal container having a length at least the same as the minimum length occupied by the ensemble of all the plates when in a position of maximum overlap and of a height appropriate to admit the thickness occupied by the overlapping plates, such that they may be almost integrally concealed in the interior thereof with the exception of small regions of the outermost end edges and with the exception also of knob means situated on one of the plates for the cover opening and closing operations.

The fundamental operation of the cover according to the invention may be derived from the above features. In fact, to open the cover the plates are moved by acting on the front plate which is the one provided with the knob means, moving them towards the interior of the internal container. To close the cover, the reverse operation is effected. The opening and closing movements may be vertical—i.e. from top to bottom and from bottom to top—, or horizontal,—i.e. from right to left and from left to right—. The choice is made in conformity with the industrial design requirements proper to each practical application.

According to the fundamental structure disclosed, it is contemplated that the cover in one embodiment may be formed by two plates where, in the closing and opening operations, the cover is moved substantially transversally to the main axis of the mirror. Bearing in mind that the sun visor mirrors are elongated rectangles, it will be understood that the plates are elongated and have a width approximately equal to half the width of the mirror. In other words, in the normal position of use of the mirror, the cover will move from bottom to top and from top to bottom, i.e. vertically, for the closing and opening movements. In this embodiment, the container in which the plates are concealed when the cover is retracted is situated below the mirror. Consequently, to open the cover, the plates are moved towards the interior of the container. And to close the cover, the reverse operation is followed, that is, by pulling the knob means outwardly so that when the first of the plates is pulled, the other follows in the same direction of movement due to the fact that the plates are connected together in chain-like fashion. In this embodiment, it will be necessary to provide securing means for maintaining the knob means in position when it is at the top of the mirror. In fact, the purpose is to prevent the plates from undesirably dropping down by gravity.

In another embodiment, three plates are used to make covers which move in a direction along the main axis of the mirror. In this case, the container is situated in the extension of one of the ends of the mirror and consequently to open the cover the plates are moved towards the interior of the container along an essentially horizontal direction relative to the vehicle floor, if the operation is performed when the sun visor is in the normal position. And to close the cover, the reverse operation is followed, i.e. the knob means is pulled outward so that when the first of the plates is pulled along, the others follow the same movement due to the fact that they are successively connected together in chain-like fashion.

According to a further feature of the invention, the means for connecting the plates successively in chain-like fashion are formed by slot-lug sets located on the lateral edges of the plates, said slots being parallel to the said edges and extending over a length slightly shorter than the length of the edge, with the whole set of cover plates forming a successive homogenous chain-like connection such that the plate at the first end of the set has only slots, the plate at the opposite end has only lugs and the intermediate plate or plates, if any, have a slot and a lug on each lateral edge, said lugs and slots being located on each plate in positional correspondence, forming sets, for connection together one after the other.

It will be understood that where the cover is formed by only two plates, as in the above described case, one of the plates is the one end plate and the other plate is the other end plate. When the cover is formed by three plates, as described for a further embodiment, there are two end plates and one single intermediate plate.

According to a further feature of the invention, the securing means for maintaining the plates in the upper position when these are moved in a vertical direction consists of a magnetic or mechanical link.

The cover as described may be incorporated into mirrors having a wide range of structures. For example, they may be mirrors without light, or mirrors provided with a light source. They may also be mirrors incorporated as original equipment in the sun visor structure or mirrors which are added subsequently to the manufacturing process, by mounting a mirror having a carrying structure in a cavity for this purpose in the structure of the sun visor body.

BRIEF DESCRIPTION OF THE DRAWINGS

The sheets of drawings accompanying the specification show as a non-limiting example two practical embodiments of the present invention. In said drawings FIGS. 1 to 7 relate to one embodiment.

FIG. 4 is a partial cross sectional front view of the mirror with the cover.

FIG. 5 is a cross sectional view of the mirror on the line V—V of FIG. 4.

FIG. 6 is a cross sectional view of the mirror on the line VI—VI of FIG. 1.

FIG. 7 is a cross sectional view of the mirror on the line VII—VII of FIG. 3.

FIG. 8 is a front view of the mirror.

FIG. 9 is a partial front view of the mirror.

FIG. 10 is a perspective view showing a constructional detail.

FIG. 11 is a cross section view of the mirror along the line XI—XI of FIG. 9.

DETAILED DESCRIPTION OF THE INVENTION

Figure 2:
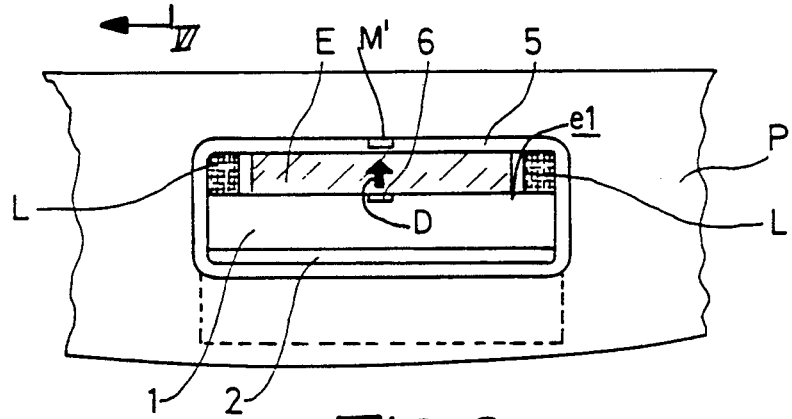
FIG. 2 is a front view of the mirror showing the cover in an intermediate stage of the closing operation.

There is described hereafter an embodiment in which the cover T comprises two rigid sheet-like plates 1 and 2 which are moved in an opening and closing direction shown with arrow D in FIG. 2 which generally coincides with the vertical direction in the automobile. This vertical opening and closing direction D is transverse to the main horizontal axis A of the mirror.

These plates 1 and 2 are made from material appropriate for the contemplated purpose, preferably rigid plastics material. It will be understood that they could also be an appropriate metallic material.

The plates 1 and 2 are substantially rectangular and elongate. The longer side has a length approximately the same as that of the mirror E of the sun visor P, and the shorter side is approximately as long as half the width of the mirror E. FIGS. 3, 4, 5, 6 and 7 allow these dimensional relationships to be observed.

Figure 1:
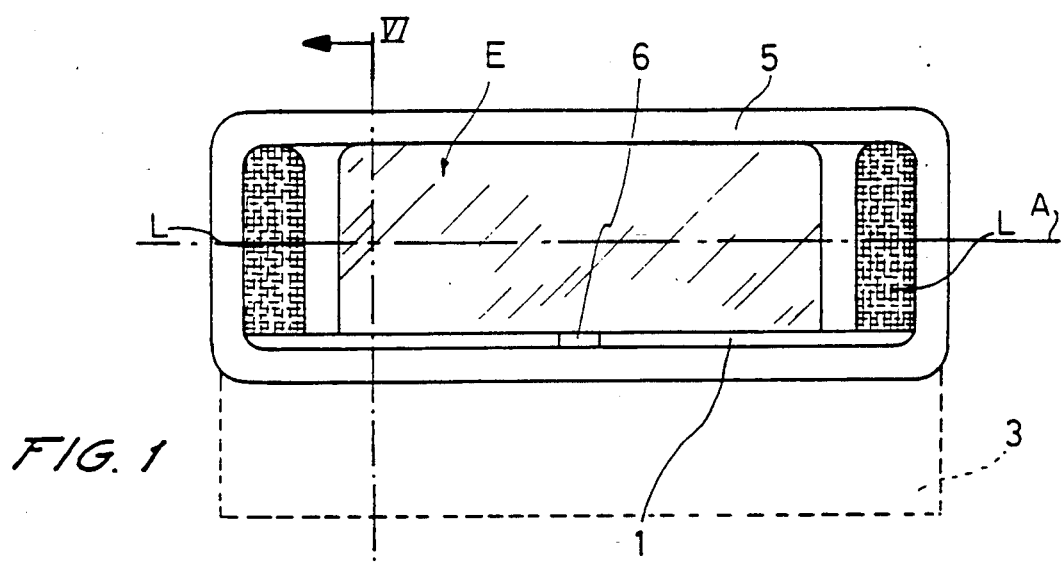
FIG. 1 is a front view of the automobile sun visor mirror. The cover has been withdrawn, leaving the mirror exposed.

In FIG. 1 the internal container 3 shaped as an extension of the side walls 4 of the frame 5 surrounding the mirror E is clearly to be seen. This same frame 5 serves to hold the two plates 1 and 2. The two plates 1 and 2 are mutually connected together with means providing for the successive chain-like mechanical attachment and also allow the plates 1 and 2 to slide one above the other, with relative independence, and with a capacity to take on two relative extreme positions: a first end position of maximum overlap in which one plate is almost completely superimposed on the other, and a second end position, opposite to the first position, of minimum overlap, in which the two plates are superimposed along a narrow strip close to the contact edges. This chain-like connection is the one obliging one plate to follow the other when either is moved beyond the above maximum and minimum positional limits.

The internal container 3 extends on the inside of the sun visor body P and the length 11 thereof, which in this case could also be called depth, has a minimum value equivalent to the minimum length occupied by the two plates 1 and 2 when they are in the position of maximum overlap. FIG. 6 is particularly appropriate to show this dimensional relationship. It may be also seen that only a small edge region of the front edges e1 of the plates 1 and 2 extends beyond the interior of the container 3 and also the knob means 6 which juts out to allow for the closing operation.

Figure 3:
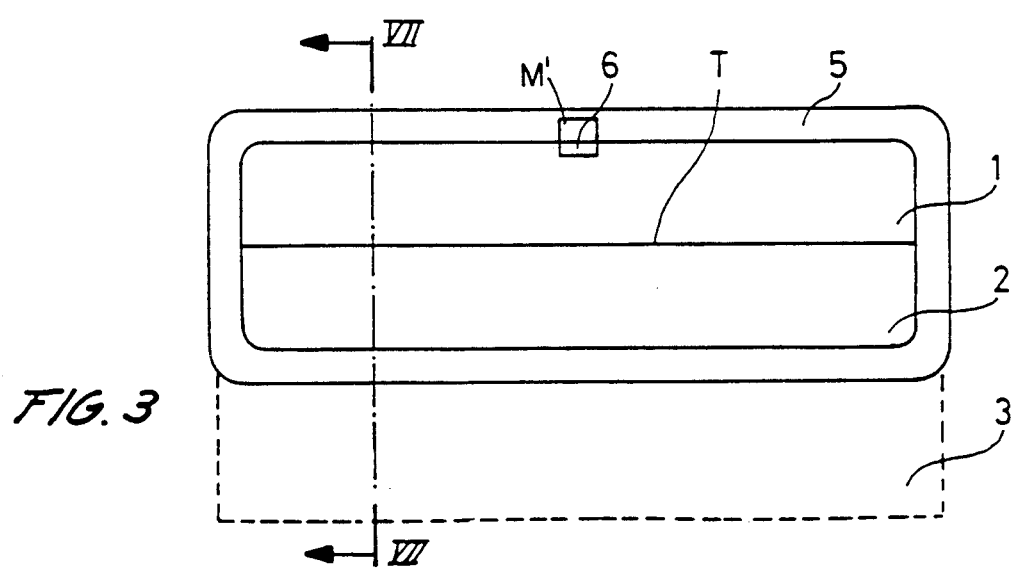
FIG. 3 is a front view of the sun visor mirror with the cover fully closed.

FIGS. 1, 2 and 3 successively show the positions of the cover T on moving from the fully open position to the fully closed position. FIG. 1 shows the cover T fully concealed, that is, in the fully open position. FIG. 6, which is a cross section on the line VI—VI of FIG. 1, shows how the two plates 1 and 2 overlap each other to the maximum possible extent at the bottom, namely within the container 3, leaving the mirror E exposed. In FIG. 2, the cover T is in an intermediate stage of the closing operation, that is moving upwards. The plate 1 is provided with the knob means 6 and has been moved over its full width and has started to carry along the plate 2.

FIG. 4 is a larger scale view showing the plates 1 and 2 in a position equivalent to the position of FIG. 2. FIG. 4 shows the mirror E and the cover T partially broken away. In this way the internal structure may be better seen. The side walls 4 of the frame 5 act as guideways for the sliding of the plates 1 and 2. FIG. 5 is a cross section on the line V—V of FIG. 4 complementing the views showing the intermediate position of the closing operation.

And in FIG. 3 it may be seen how the two plates 1 and 2 are fully extended, that is covering the mirror E.

In the position of FIG. 3, gravity would cause an undesired spontaneous drop of the plates 1 and 2, above all if the automobile is in movement because then the vibration may help to overcome the friction of this system. To avoid this undesired phenomenon, there is contemplated the provision of securing means for maintaining the closed position which in the case of the example are concealed magnets M. The elementary construction derived from the incorporation of these magnets M makes it unnecessary to show them in detail in the figures. Of course, any appropriate mechanical linking means M may be used alternatively. One of the most appropriate places for locating the closing or hooking means, that is the mechanical means deemed to be desirable, is in the region close to the knob means 6 or even attached to the knob means 6 as shown in FIG. 2.

FIG. 7 is a cross section on the line VII—VII of FIG. 3, showing how the two plates 1 and 2 are located overlapping only along a narrow region of their respectively closest edges, fully covering the mirror E.

The structure described above allows the cover T of a large mirror to be concealed with a container 3 of a relatively small volume, with the important advantage that the cover T is formed by rigid parts, the mechanical properties of which are particularly appropriate for ensuring the correct operation throughout the whole working life of the mirror E.

Figure 8:
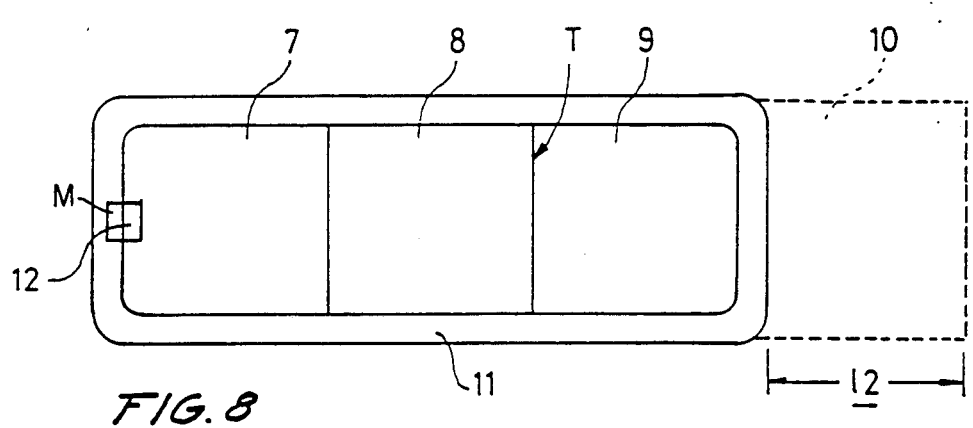
FIGS. 8 and 9 refer specifically to another embodiment.
Figure 9:
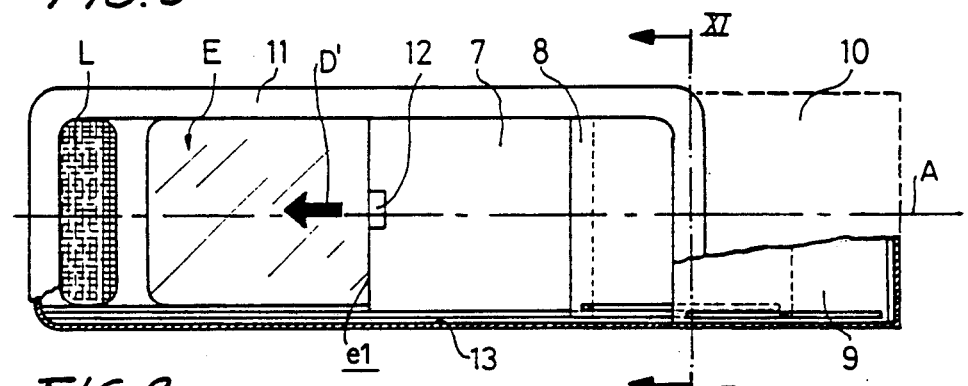

FIGS. 8 and 9 show a constructional variation which is fundamentally coincident with the above described embodiment illustrated in FIGS. 1 to 7.

According to this constructional variant, the mirror E, which is drawn in a similar way as to how it is mounted on the sun visor body P, that is disposed lengthwise with its main horizontal axis A parallel to the floor, is covered by a cover T formed by three plates 7, 8 and 9 which are moved in an opening and closing direction D' which is coincident with the horizontal axis A. Therefore, in this case the internal container 10 is located as an extension towards one side of one of the ends of the frame 11. In FIG. 8 the cover T is in the closed position, that is completely covering the mirror E. The knob means 12 is located on the plate 7.

FIG. 9 is an overall view, partially cutaway, of the mirror E and the cover T. This view allows the internal structure of this embodiment to be examined, which as said above is very similar to the embodiment illustrated in FIGS. 1 to 7. The internal container 10 is an extension of the side walls 13 of the frame 11 and the length 12 thereof is approximately equal to one third of the length of the mirror E. Also in this embodiment there is achieved the special advantage of being able to store the rigid cover T inside a container 10 having relatively small dimensions.

Figure 10:
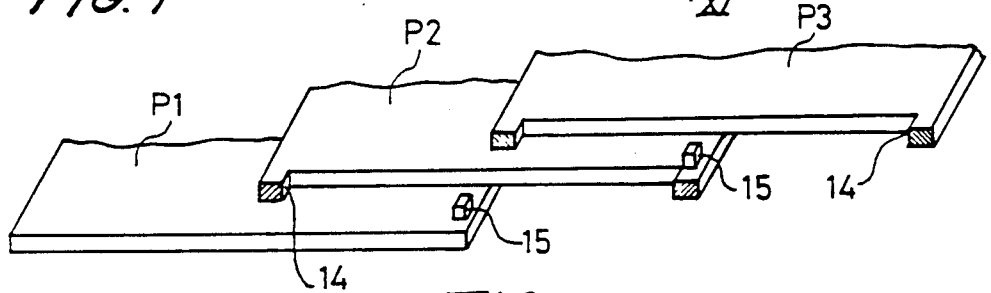
FIGS. 10 and 11 show constructional details common to both embodiments. In the drawing.

FIG. 10 is a diagram showing one example of the connection means providing the mechanical attachment between the plates (1 and 2; or 7, 8 and 9) forming the cover T. Three plates P1, P2 and P3 have been drawn since in the broadest and most general representation serving directly to understand the connection in the embodiment of FIGS. 8 and 9. In other words, the three plates P1, P2 and P3 are identically equivalent to the plates 7, 8 and 9 of FIGS. 8 and 9. But it is very obvious to translate this schematic representation to what happens in the embodiment of FIGS. 1 to 7. In this case, the plates 1 and 2 are structurally equivalent to the plates P1 and P3 of FIG. 10.

The connection is effected by sets of slot 14 and lug 15 located on the lateral edges of the plates P1, P2 and P3. It may be seen how the slots 14 extend parallel to the edges of the plates and they are slightly shorter than the length of the edges. It may be seen that plate P1, which is one end plate of the set of three plates, is provided only with the lug 15. And the other end plate, that is the plate P3, is provided only with the slot 14. The plate P2, which is the intermediate one, has a slot 14 and a lug 15. Where there are more than three plates, the intermediate plates are provided with slot 14 and lug 15. And in the example of FIGS. 1 to 7 since there are only two plates, plate 1 and plate 2 will have, respectively, the same structure as plates P1 and P3 of FIG. 10.

It will be seen in FIG. 10 how the plates P1, P2 and P3 are connected together in a chain-like fashion, that is, if one end plate is pulled this will pull the others along with it when the lugs 15 reach the end of movement within the corresponding slots 14.

Figure 11:
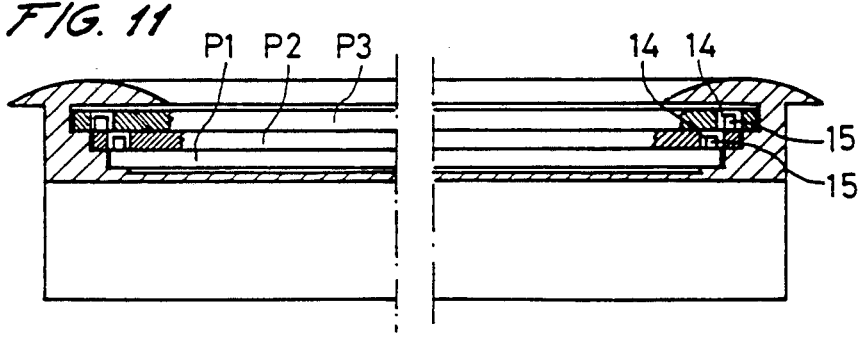

FIG. 11 is a cross section view showing the relative positions of the slot 14 and lug 15 sets to ensure that they do not mutually hinder each other. In this way, the plates move gently and reliably for a very large number of operations. This FIG. 11 is also general, and although it shows the embodiment of FIGS. 8 and 9, it may be applied to the embodiment of FIGS. 1 and 7 in the same way as has been done in the explanation of FIG. 10.

In the two embodiments explained the mirror E is provided with light sources L. It will be understood that these light sources L do not form part of the invention and, therefore, may be deleted or may have a completely different configuration, form or structure from the one shown.

It will also be understood that each of the elements described above, or two or more together, may also find a useful application in other types of structures differing from the types described above.

While the invention has been illustrated and described as embodied in a cover for an automobile sun visor mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims;

1. A cover for an automobile sun visor mirror mounted in a mirror frame of a sun visor body, said mirror frame having side walls and said mirror having a main horizontal axis, comprising a plurality of rigid, substantially rectangular, overlapping sheet-like plates, said sheet-like plates having a plurality of outermost end edges and regions in the vicinity of said outermost end edges, knob means attached to one of said plates adjacent one of said outermost end edges, means for connecting said sheet-like plates in continuous chain-like succession so that said plates are slidable over one another in an opening and closing direction of said cover, said plates being mounted in said mirror frame and fitting smoothly but slidably between said side walls of said mirror frame, said side walls having guideways in which said plates are engagable and extending inside said sun visor body so as to form an internal container having a length in said opening and closing direction at least substantially equal to a minimum length of said plurality of said plates when said plates are overlapped to a maximum extent and having a height at least approximately equal to a thickness of said plates so overlapped to said maximum extent so that said plates are concealable in said internal container except for said knob means and for said regions at said outermost end edges of plates.

2. A cover according to claim 1, wherein said plurality of said plates consists of two of said plates, said opening and closing direction is substantially transverse to said main horizontal axis of said mirror and said container is located below said mirror.

3. A cover according to claim 1, wherein said plurality of said plates consists of three of said plates, said opening and closing direction is substantially coincident with said main horizontal axis of said mirror and said container is disposed laterally of one end of said mirror.

4. A cover according to claim 1, further comprising securing means located in the vicinity of said knob means, when said plates are moved into a position substantially covering said mirror, said securing means cooperating with said knob means to hold said plates in said position covering said mirror.

5. A cover according to claim 4, wherein said securing means comprises a magnet.

6. A cover according to claim 4, wherein said securing means comprises a mechanical link.

7. A cover according to claim 1, wherein said connecting means comprises sets of slots and lugs, each of said sets being located in the vicinity of a lateral edge of said plates, said slots extending substantially parallel to said lateral edges of said plates and being slightly shorter than a length of one of said lateral edges, one of said plates at one end of said plurality of plates being provided only with said slots, while another of said plates at another end of said plurality opposite to said one end being provided only with said lugs and all of said plates between said plate at said one end and said plate at said other opposite end having one of said slots and one of said lugs, said lugs and slots being located on each of said plates in a positional correspondence for connecting each of said plates together slidable over each other from said minimum position to a position covering said mirror.

* * * * *